(12) United States Patent
Kvamme et al.

(10) Patent No.: US 7,654,583 B2
(45) Date of Patent: Feb. 2, 2010

(54) DEVICE FOR A PRESSURE-COMPENSATED SWIVEL

(76) Inventors: Jostein Kvamme, Finnestadsvingen 24, Stavanger (NO) N-4029; Atle Kvamme, Finnestadsvingen 24, Stavanger (NO) N-4029

( * ) Notice: Subject to any disclaimer, the term of this patent is extended or adjusted under 35 U.S.C. 154(b) by 0 days.

(21) Appl. No.: 11/661,408

(22) PCT Filed: Aug. 30, 2005

(86) PCT No.: PCT/NO2005/000313

§ 371 (c)(1),
(2), (4) Date: May 15, 2008

(87) PCT Pub. No.: WO2006/025746

PCT Pub. Date: Mar. 9, 2006

(65) Prior Publication Data

US 2008/0290656 A1 Nov. 27, 2008

(30) Foreign Application Priority Data

Aug. 31, 2004 (NO) .................................. 20043628

(51) Int. Cl.
*F16L 27/08* (2006.01)
*F16L 27/087* (2006.01)
(52) U.S. Cl. ..................... 285/276; 285/98; 285/106; 285/275
(58) Field of Classification Search ................ 285/98, 285/100, 101, 102, 106, 108, 121.6, 275, 285/276, 277, 278, 900
See application file for complete search history.

(56) References Cited

U.S. PATENT DOCUMENTS

| 2,421,691 | A | * | 6/1947 | Gibson, Jr. et al. .......... 285/101 |
| 3,454,288 | A | * | 7/1969 | Mancusi, Jr. ................ 285/98 |
| 3,479,061 | A | * | 11/1969 | Smookler et al. ............ 285/94 |
| 3,575,060 | A | * | 4/1971 | Warren ........................ 74/425 |
| 3,712,645 | A | * | 1/1973 | Herter ......................... 285/95 |
| 3,776,578 | A | | 12/1973 | Jessup et al. |
| 4,059,288 | A | * | 11/1977 | Mohr ........................... 285/2 |
| 4,302,033 | A | | 11/1981 | Evans et al. |
| 4,348,039 | A | * | 9/1982 | Miller .......................... 285/1 |
| 4,355,827 | A | * | 10/1982 | Ehret ........................... 285/98 |
| 4,462,617 | A | * | 7/1984 | Green .......................... 285/14 |
| 4,501,287 | A | * | 2/1985 | Thomson ................. 137/68.15 |
| 4,688,827 | A | * | 8/1987 | Bassett ......................... 285/2 |
| 5,035,448 | A | * | 7/1991 | Seabrook et al. ............ 285/94 |
| 5,044,672 | A | | 9/1991 | Skeels et al. |
| 5,052,720 | A | * | 10/1991 | Yoda .......................... 285/14 |
| 5,269,345 | A | | 12/1993 | Hiestand et al. |
| 6,145,889 | A | | 11/2000 | Imai |
| 6,145,890 | A | | 11/2000 | Hiestand |

FOREIGN PATENT DOCUMENTS

DE 29 47 170 A1 6/1981

* cited by examiner

*Primary Examiner*—James M Hewitt
(74) *Attorney, Agent, or Firm*—Andrus, Sceales, Starke & Sawall, LLP

(57) ABSTRACT

A device for a pressure-compensated swivel comprising a swivel housing and a swivel pipe rotatably arranged in the swivel housing, wherein pressure from fluid in the swivel acts on opposing compensating areas in the swivel, whereby an axially compressive force is established between the swivel housing and the swivel pipe.

8 Claims, 2 Drawing Sheets

DEVICE FOR A PRESSURE-COMPENSATED SWIVEL

CROSS-REFERENCE TO RELATED APPLICATIONS

This application is the U.S. national stage application of International Application PCT/NO2005/000313, filed Aug. 30, 2005, which International Application was published on Mar. 9, 2006, as International Publication No. WO 2006/025746 A1 in the English language. The International Application claims priority of Norwegian Patent Application 20043628, fled Aug. 31, 2004.

BACKGROUND OF THE INVENTION

This invention regards a pressure-compensated swivel. More particularly, it regards a tubular swivel comprising a swivel housing and a swivel pipe rotatably arranged in the swivel housing, wherein pressure from the fluid flowing through the swivel acts on opposing areas, whereby an axially compressive force is established between the swivel housing and the swivel pipe.

Interconnected pipes or tubes that are interrotatable about their longitudinal axis are often joined by means of a swivel. This type of swivel can often experience relatively large fluid pressure forces that seek to move the components of the swivel apart.

In prior art, bearings in the form of slide bearings or roller bearings are used to accommodate these forces of separation.

When using swivel connections connected to the so-called choke- and kill lines associated with risers, such as is known from offshore petroleum production, known swivels have been found to have a tendency to lock up due to relatively high pressures, preventing the interrotation of the swivel connections. This type of unwanted event can cause great additional loads on adjoining hoses and pipes. In addition it may lead to a shutdown with incident financial losses.

SUMMARY OF THE INVENTION

The object of the invention is to remedy or diminish at least one of the disadvantages of prior art.

The object is achieved in accordance with the invention, by the characteristics stated in the description below and in the following claims.

In a swivel comprising a swivel housing and a swivel pipe rotatably arranged in the swivel housing, there is provided opposing compensating areas against which pressure from the fluid in the swivel acts. The force against the compensating areas resulting from the fluid pressure provides an axially compressive force between the swivel housing and the swivel pipe.

Advantageously said compensating areas are arranged in an annulus provided between the swivel housing and the swivel pipe, wherein a first compensating area is located on a thrust collar connected to the swivel housing and a second compensating area is located on a pivot ring connected to the swivel pipe.

Typically a compression volume between the first and second compensating areas is supplied with fluid from the swivel via an orifice in the thrust collar or the pivot ring.

Preferably, the sizes of the first and second compensating areas are controlled by defining the outer and inner diameters, and thus the sizes, of the compensating areas by means of packings. If so desired, the swivel may be completely compensated, so that the pressure in the swivel has only a negligible effect on the torque required to rotate the swivel pipe in the swivel housing.

For practical reasons it may be beneficial not to compensate the forces of separation fully. Alternatively the forces of separation may be overcompensated, so that the sum of the forces acting between the swivel pipe and the swivel housing constitutes a force seeking to displace the swivel pipe in a direction into the swivel housing.

The device is self-compensating, by the ratio between the fluid pressure dependent axial force between the swivel pipe and the swivel housing seeking to displace the swivel pipe out of the swivel housing, and the fluid pressure dependent axial force seeking to displace the swivel pipe into the swivel housing, being constant.

Adjusting the size of the compensating areas according to, among other things, the sealing arrangement and the anticipated fluid pressure in the swivel allows the torque required to rotate the swivel pipe in the swivel housing to be selected.

BRIEF DESCRIPTION OF THE DRAWINGS

The following describes a non-limiting example of a preferred embodiment illustrated in the accompanying drawings, in which.

DETAILED DESCRIPTION OF THE DRAWINGS

Figure 1:
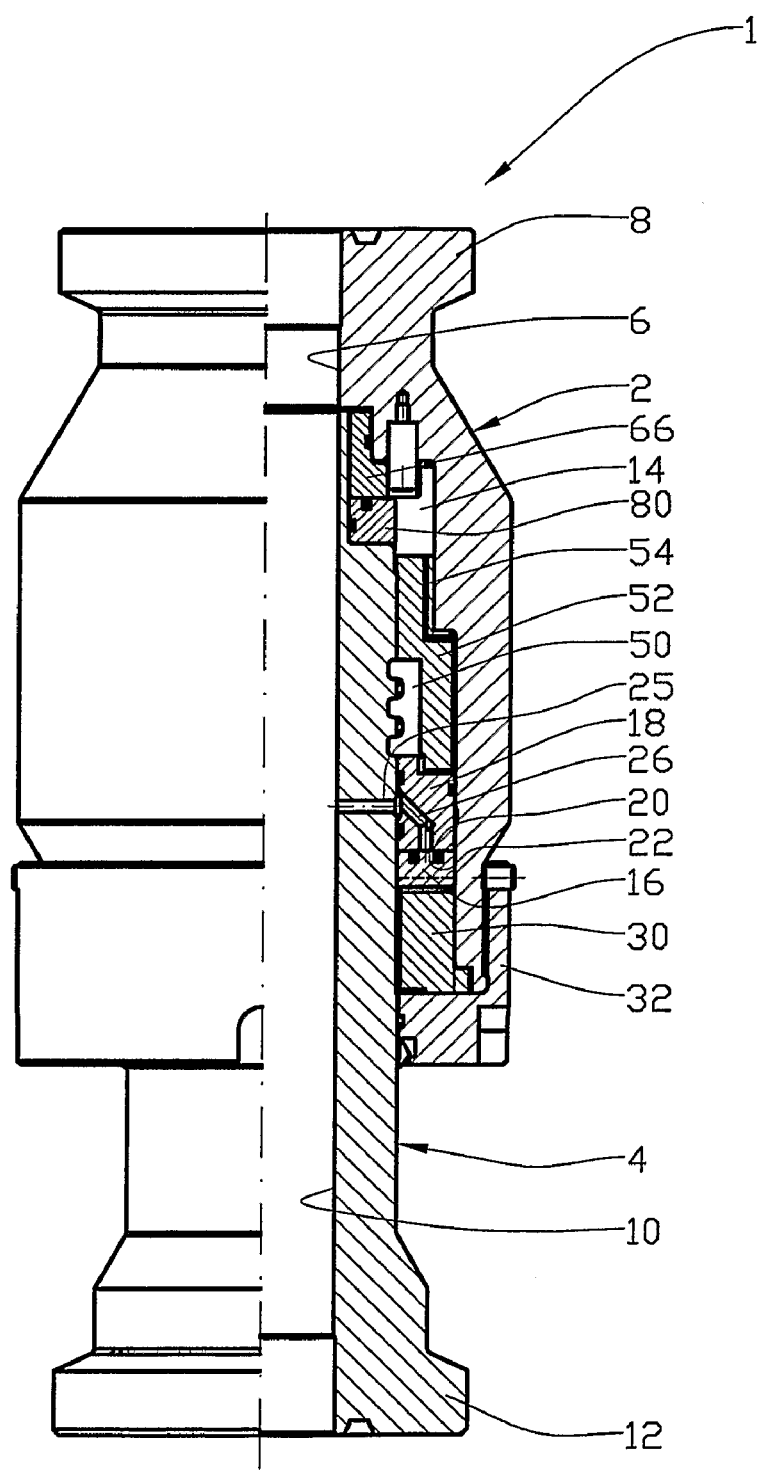
FIG. 1 shows a swivel according to the invention partially sectioned.
Figure 2:
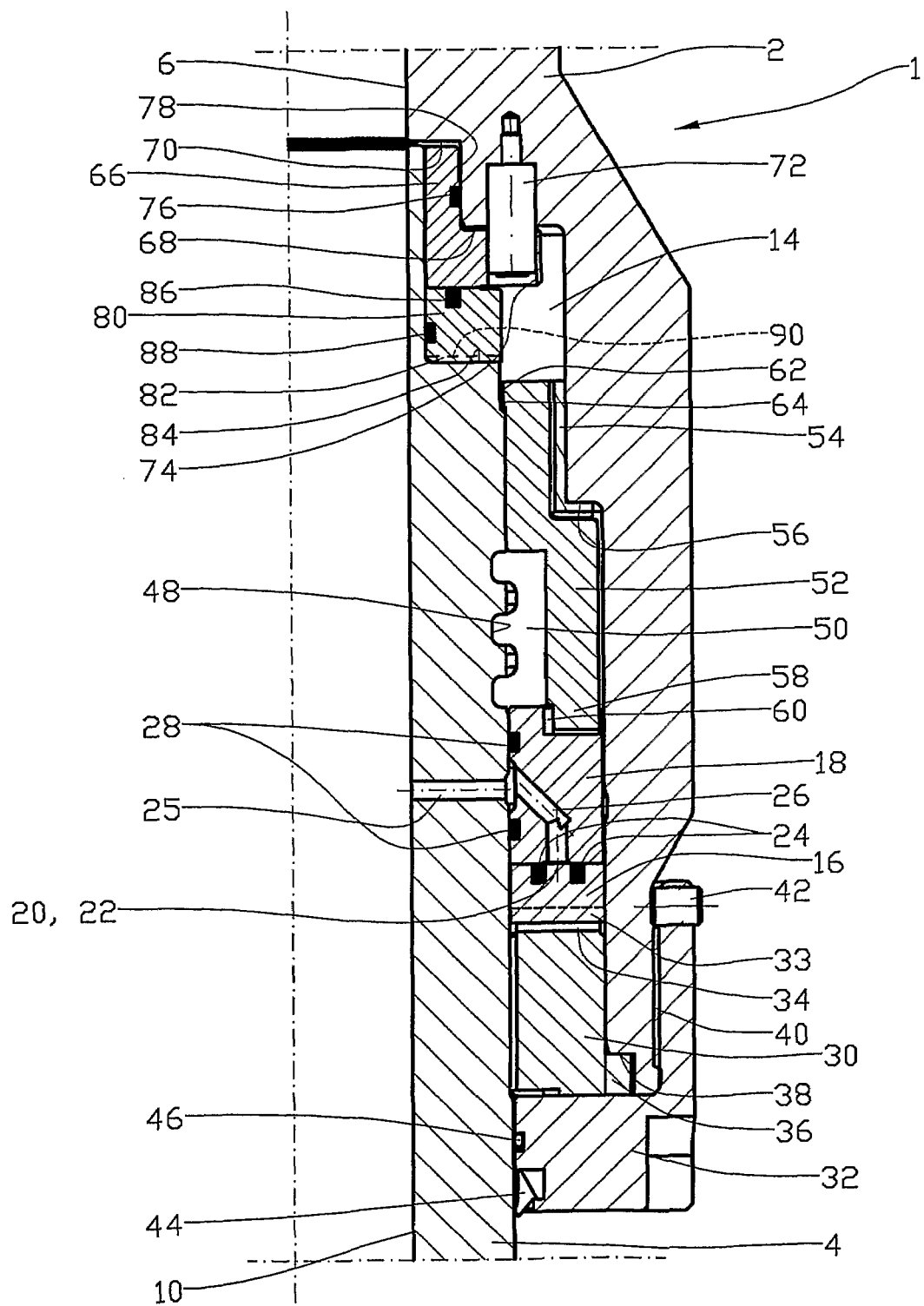
FIG. 2 is a section of the swivel of FIG. 1 on a larger scale.

In the drawings, reference number 1 denotes a swivel comprising a swivel housing 2 and a swivel pipe 4. The swivel housing 2 is formed with a stepped through bore 6 and is provided, at the end portion corresponding to the smallest diameter of the stepped bore 6, with a coupling half 8 in the form of a flange-like ring that complementary matches a coupling on a pipe (not shown).

The swivel pipe 4 is provided with a through bore 10, preferably of a similar diameter to the smallest diameter of the stepped bore 6. The swivel pipe 4 projects concentrically into the swivel housing 2, with the end portion protruding from the swivel housing being provided with a coupling half 12, preferably of the same type as the coupling half 8. Thus the swivel 1 is arranged to be installed in a piping system (not shown) by means of coupling halves 8 and 12.

In an annulus 14 formed between a longitudinal portion of the stepped bore 6 and the swivel pipe 4 there is arranged a thrust collar 16 and an adjacent pivot ring 18, both of which encircle the swivel pipe 4. There is a first compensating area 20 on the side of the thrust collar 16 facing the pivot ring 18, while an opposing second compensating area 22 is located on the side of the pivot ring 18 facing the thrust collar 16.

First annular packings 24 define the greatest and smallest diameters of the compensating areas 20, 22. The volume defined between the compensating areas 20, 22 is supplied with fluid from the through bore 10 in the swivel pipe 4 via a radial bore 25 in the pipe wall of the swivel pipe 4, and an inclined bore 26 in the pivot ring 18 which corresponds with the radial bore 25, the inclined bore 26 ending up between the first annular packings 24.

Two other packings 28 prevent fluid from flowing out between the swivel pipe 4 and the pivot ring 18.

The thrust collar 16 is connected to the swivel housing 2 by a bearing ring 30 and a nut 32. The thrust collar 16, which axially abut against the bearing ring 30, is inhibited from rotating with respect to the bearing ring 30 by two wedge-shaped first pins 33 protruding from the thrust collar 16 being arranged in a complementary first groove 34 in the bearing ring 30.

The bearing ring 30, which is preferably made from a somewhat softer material than the swivel pipe 4, is in external guiding abutment against the stepped bore 6. The internal cylindrical surface of the bearing ring 30 forms a support for the swivel pipe 4. The bearing ring 30 is prevented from rotating in the swivel housing 2 by two second pins 36 protruding from the bearing ring 30 and into a complementary second groove 38 in the swivel housing 2.

The bearing ring 30 axially abuts the nut 32, the nut being connected to the swivel housing 2 by a threaded connection 40 that is locked by means of a retaining screw 42.

The internal bore of the nut 32 is provided with an annular scraper 44 and a third annular packing 46, both of which sealingly abut the swivel pipe 4.

The outside of the swivel pipe 4 is provided with locking grooves 48 that are a complementary fit to a divided interlock ring 50. The interlock ring 50 is retained in the locking grooves 48 by an encircling locking sleeve 52. The locking sleeve 52 abuts the stepped bore 6 and the first shoulder 56 of the stepped bore 6 via a bearing sleeve 54. Thus the locking sleeve 52 is prevented from getting displaced out of the interlock ring 50.

The pivot ring 18 axially abuts the interlock ring 50 and is prevented from rotating with respect to the locking sleeve 52 by a third wedge-shaped lug 58 from the locking sleeve 52 being arranged in a complementary third groove 60 in the pivot ring 18. Correspondingly, a fourth wedge-shaped lug 62 projects from the locking sleeve 52 into a complementary fourth groove 64 in the swivel pipe 4. Thus the pivot ring 18 is rotationally locked to the swivel pipe 4 by the locking sleeve 52.

A flange-like axially displaceable supporting ring 66 is provided by the second shoulder 68 and third shoulder 70 of the stepped bore 6. The supporting ring 66 is prevented from rotating in the swivel housing 2 by guide pegs 72 projecting axially from the second shoulder 68 of the swivel housing 2 and into complementary bores 74 in the supporting ring 66. A fourth annular packing 76 in the inner external cylindrical surface 78 of the supporting ring 66, which packing abuts the stepped bore 6 between the second and third shoulders 68 and 70, prevents fluid from flowing between the stepped bore 6 and the supporting ring 66.

The supporting ring 66 is in axially sliding abutment against an intermediate ring 80 provided on the swivel pipe 4, which ring is coupled to the swivel pipe 4 in a rotationally fixed manner by means of a fifth wedge-shaped pin 82 and a complementary fifth groove 84. A fifth annular packing 86 and a sixth annular packing 88 prevent fluid from flowing between the supporting ring 66 and the intermediate ring 80 and between the intermediate ring 80 and the swivel pipe 4, respectively, the intermediate ring 80 axially abutting a shoulder 90 on the swivel pipe 4.

Preferably, the supporting ring 66 is biased in the direction of the swivel pipe 4 by means of springs (not shown) in the swivel housing 2.

Advantageously the surfaces abutting each other between the thrust collar 16 and the pivot ring 18, and also between the supporting ring 66 and the intermediate ring 80, and which slide against each other when the swivel pipe 4 is rotated in the swivel housing 2, are provided with a wearing coat.

When fluid pressure is applied to the bores 6 and 10 of the swivel 1, the annular area between the through bore 10 of the swivel pipe and the outside diameter of the fourth annular packing 76, which is arranged in the inner external cylindrical surface 78 of the supporting ring 66, functions as a piston area. Fluid pressure acting on this area seeks to displace the swivel pipe 4 out of the swivel housing 2. These forces are transferred from the swivel pipe 4 to the swivel housing 2 by means of the interlock ring 50, the pivot ring 18, the thrust collar 16, the bearing ring 30 and the nut 32, as described above.

By using the groove diameter of the fifth annular packing 86 it is possible to determine what proportion of the force from the fluid pressure is to be transferred to the intermediate ring 80. If the groove diameter of the fifth annular packing 86 is equal to the diameter of the surface 78 of the cylinder, the axial force between the supporting ring 66 and the intermediate ring 80 is unaffected by the fluid pressure in the swivel 1.

Fluid may flow into the cavity between the first compensating area 20 and the second compensating area 22 through bores 25 and 26. The pressure of the fluid seeks to displace the pivot ring 18 from the thrust collar 16, and by doing so displace the pivot ring 18 with the swivel pipe 4 into the swivel housing 2.

By selecting compensating areas 20, 22 that are appropriate and substantially equal to said piston area, it becomes possible to compensate the fluid pressure induced axial forces, ensuring that the moment required to rotate the swivel pipe 4 in the swivel hosing 2 is essentially independent of the fluid pressure in the swivel 1.

The invention claimed is:

1. A pressure compensated swivel comprising:
a swivel housing;
a swivel pipe that is rotatably coupled to and arranged in the swivel housing;
wherein fluid pressure in the swivel acts on opposing compensating areas in the swivel to push the swivel housing and swivel pipe together so that an amount of torque required to rotate the swivel pipe relative to the swivel housing is substantially unaffected by the fluid pressure in the swivel;
wherein the opposing compensating areas are disposed in an annulus between the swivel housing and the swivel pipe; and
a thrust collar coupled to the swivel housing and a pivot ring coupled to the swivel pipe, wherein the opposing compensating areas comprise a first compensating area on the thrust collar and a second compensating area on the pivot ring;
wherein the thrust collar and pivot ring are disposed in the annulus between the swivel housing and swivel pipe and wherein the first compensating area and the second compensating area receive the fluid pressure via an orifice in the pivot ring;
wherein the first compensating area and the second compensating area receive fluid pressure via an orifice in the swivel pipe;
wherein the orifice in the swivel pipe comprises a radial through-bore and wherein the orifice in the pivot ring comprises a through-bore that extends transversely relative to the radial through-bore; and
wherein the through-bore in the pivot ring has an end that is disposed between annular packings that define boundaries of the first and second compensating areas.

2. The pressure compensated swivel according to claim 1, wherein the thrust collar is coupled to a bearing ring in a manner that prevents rotation of the thrust collar relative to the bearing ring, wherein the bearing ring supports rotation of the swivel pipe.

3. The pressure compensated swivel according to claim 2, wherein the swivel pipe comprises an outer surface having locking grooves and wherein the swivel housing comprises an interlock ring that mates with the locking grooves and allows for rotation of the swivel pipe relative to the swivel housing.

4. The pressure compensated swivel according to claim 3, wherein the interlock ring is retained in the locking grooves by a locking sleeve.

5. The pressure compensated swivel according to claim 4, wherein the pivot ring is rotationally locked relative to the swivel pipe via the locking sleeve.

6. The pressure compensated swivel according to claim 5, comprising a supporting ring fixed to the swivel housing, an intermediate ring fixed to the swivel pipe, and a plurality of packings sealing between the supporting ring and swivel housing, the supporting ring and intermediate ring, and the intermediate ring and swivel pipe.

7. The pressure compensated swivel according to claim 1, wherein the compensating areas have outer and inner diameters that are defined by the annular packings in the compensating areas.

8. The pressure compensated swivel according to claim 7, wherein adjustment of the size of the respective compensating areas by adjusting the location of the annular packings thereby adjusts the torque required to rotate the swivel pipe in the swivel housing.

* * * * *